(12) United States Patent
Singh et al.

(10) Patent No.: US 11,298,991 B2
(45) Date of Patent: Apr. 12, 2022

(54) TIRE LOAD ESTIMATION SYSTEM AND METHOD

(71) Applicant: The Goodyear Tire & Rubber Company, Akron, OH (US)

(72) Inventors: Kanwar Bharat Singh, Lorenztweiler (LU); Anthony William Parsons, Domeldange (LU); Mustafa Ali Arat, Ettelbruck (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 423 days.

(21) Appl. No.: 16/509,619

(22) Filed: Jul. 12, 2019

(65) Prior Publication Data

US 2020/0164703 A1 May 28, 2020

Related U.S. Application Data

(60) Provisional application No. 62/772,151, filed on Nov. 28, 2018.

(51) Int. Cl.
*B60C 23/06* (2006.01)
*G01G 19/02* (2006.01)
(Continued)

(52) U.S. Cl.
CPC ......... *B60C 23/064* (2013.01); *G01G 19/027* (2013.01); *G01M 1/326* (2013.01); *G01G 19/08* (2013.01)

(58) Field of Classification Search
CPC ..... B60C 23/064; B60C 11/24; B60C 11/243; B60C 11/246; B60C 23/04;
(Continued)

(56) References Cited

U.S. PATENT DOCUMENTS 3,661,014 A * 5/1972 Ciampolini ........ B29D 30/0633
73/146
4,724,703 A 2/1988 Neugebauer et al.
(Continued)

FOREIGN PATENT DOCUMENTS

EP 2138372 A1 8/2012
EP 2679411 A2 1/2014
(Continued)

*Primary Examiner* — Nimeshkumar D Patel
*Assistant Examiner* — Gedeon M Kidanu
(74) *Attorney, Agent, or Firm* — Edward T. Kennedy (57) ABSTRACT

A tire load estimation system includes at least one tire supporting a vehicle, in which the at least one tire includes a pair of sidewalls extending to a circumferential tread. A sensor is mounted to the at least one tire. A footprint is formed by the tread and includes a centerline with a footprint centerline length. The footprint centerline length is measured by the sensor. A tire load estimator receives a precalibrated sensitivity, the footprint centerline length during straight-line driving conditions, a reference footprint value, and a reference load value as inputs. The tire load estimator determines an estimation of tire load and outputs the estimation to at least one of a vehicle control system and a vehicle electronic control unit. A method for estimating the load of a tire is also provided.

17 Claims, 8 Drawing Sheets

(51) Int. Cl.
*G01M 1/32* (2006.01)
*G01G 19/08* (2006.01)

(58) Field of Classification Search
CPC ........... B60C 23/0408; B60C 23/0411; G01M 1/326; G01M 17/02; G01M 17/025
See application file for complete search history.

(56) References Cited

U.S. PATENT DOCUMENTS

| | | | |
|---|---|---|---|
| 6,278,361 B1 | 8/2001 | Magiawala et al. | |
| 6,321,180 B1* | 11/2001 | Hubbell, Jr. | ........ B60C 11/0332 73/146 |
| 6,539,295 B1 | 3/2003 | Katzen et al. | |
| 6,959,593 B2* | 11/2005 | Mancosu | ............ B60R 16/0237 73/146 |
| 7,000,462 B2 | 2/2006 | Hillenmayer et al. | |
| 7,404,317 B2 | 7/2008 | Mancosu et al. | |
| 7,536,903 B2 | 5/2009 | Schillinger et al. | |
| 7,546,764 B2 | 6/2009 | Morinaga | |
| 7,552,628 B2 | 6/2009 | Mancosu | |
| 8,255,114 B2 | 8/2012 | Fink et al. | |
| 8,661,885 B1 | 3/2014 | Singh et al. | |
| 8,742,911 B2 | 6/2014 | Wagner et al. | |
| 8,844,346 B1 | 9/2014 | Singh et al. | |
| 8,874,386 B2 | 10/2014 | Brusarosco et al. | |
| 9,120,356 B2 | 9/2015 | Patel et al. | |
| 9,157,785 B2 | 10/2015 | Brenninger | |
| 9,222,854 B2 | 12/2015 | Singh et al. | |
| 9,310,242 B2 | 4/2016 | Kammann et al. | |
| 9,358,846 B2 | 6/2016 | Singh et al. | |
| 9,874,496 B2 | 1/2018 | Singh | |
| 10,245,906 B2 | 4/2019 | Singh et al. | |
| 2003/0058118 A1 | 3/2003 | Wilson | |
| 2003/0149515 A1* | 8/2003 | Hessmert | ............. B60T 8/1764 701/1 |
| 2005/0072223 A1 | 4/2005 | Fennel et al. | |
| 2005/0085987 A1 | 4/2005 | Yokota et al. | |
| 2005/0150283 A1 | 7/2005 | Shick | |
| 2007/0240501 A1* | 10/2007 | Mancosu | ........... B60C 23/0408 73/146 |
| 2008/0103659 A1 | 5/2008 | Mancosu | |
| 2009/0055040 A1 | 2/2009 | Nagaya | |
| 2011/0060500 A1 | 3/2011 | Irth et al. | |
| 2011/0199201 A1 | 8/2011 | Brusarosco et al. | |
| 2012/0029759 A1 | 2/2012 | Suh et al. | |
| 2013/0211621 A1 | 8/2013 | Breuer et al. | |
| 2013/0261991 A1 | 10/2013 | Tebano et al. | |
| 2013/0278406 A1 | 10/2013 | Weston | |
| 2014/0005956 A1* | 1/2014 | Patel | ....... B60C 23/04 702/41 |
| 2014/0069181 A1* | 3/2014 | Singh | ................. B60C 23/0408 73/146.3 |
| 2014/0257629 A1* | 9/2014 | Singh | .................... B60T 8/1725 701/34.4 |
| 2014/0260585 A1 | 9/2014 | Singh | |
| 2014/0278040 A1* | 9/2014 | Singh | ................. B60T 8/17551 701/124 |
| 2015/0217607 A1* | 8/2015 | Singh | ................. B60C 23/0488 73/146.3 |
| 2015/0247780 A1* | 9/2015 | Kretschmann | ........ B60C 23/064 73/146.5 |
| 2016/0129737 A1 | 5/2016 | Singh et al. | |
| 2016/0153827 A1 | 6/2016 | Ham et al. | |
| 2017/0355234 A1* | 12/2017 | Dharamshi | ............. B60C 11/24 |
| 2019/0025113 A1* | 1/2019 | Masago | ................ G01M 17/02 |

FOREIGN PATENT DOCUMENTS

| | | | | |
|---|---|---|---|---|
| EP | 2777956 A2 | 9/2014 | | |
| EP | 2778631 A2 * | 9/2014 | .......... | B60T 8/17551 |
| JP | 2007153034 A | 6/2007 | | |
| JP | 2011053027 A | 3/2011 | | |
| WO | 2008075126 A1 | 6/2008 | | |
| WO | WO2011054363 A1 | 5/2011 | | |

\* cited by examiner

SENSITIVITY RATIO (SR)

$$\frac{(Y_2-Y_1)\frac{(X_2+X_1)}{2}}{(X_2-X_1)\frac{(Y_2+Y_1)}{2}} = \frac{\Delta Y}{\overline{Y}}\frac{\overline{X}}{\Delta X}$$

FIGURE 4A

FIGURE 4B $$\frac{\%\text{ CHANGE IN PATCH LENGTH}}{\%\text{ CHANGE IN TIRE LOAD}} = 0.69$$

TIRE LOAD ESTIMATION SYSTEM AND METHOD

FIELD OF THE INVENTION

The invention relates generally to tire monitoring systems. More particularly, the invention relates to systems that collect tire parameter data. The invention is directed to a system and method for estimating tire load which, rather than relying on fixed parameters, incorporates multiple tire and vehicle parameters in monitoring a change in the tire footprint length to provide an accurate and reliable estimation of tire load.

BACKGROUND OF THE INVENTION

The load on each tire of a vehicle plays an important role in vehicle factors such as handling, safety, reliability, and performance. Measurement or estimation of the load on a tire during the operation of a vehicle is often used by vehicle control systems such as braking, traction, stability, and suspension systems. For instance, information about individual tire loads enables precise estimation of the load distribution between the front and the rear axle of the vehicle, which can then be used to optimize the brake control system. Alternatively, knowledge of tire loads and consequently the vehicle mass may enable more accurate estimation of the remaining range of an electric vehicle. Thus, it is desirable to estimate the load on a tire in an accurate and reliable manner for input or use in such systems.

Prior art approaches have involved attempts at directly measuring tire load using load or strain sensors. Such direct-measurement techniques have experienced disadvantages due to the difficulty in achieving a sensor with a construction and placement on the tire that enables accurate and consistent measurement of tire load, particularly over the life of a tire.

Other prior art approaches have been developed that involve estimation of tire load using fixed parameters. Such prior art approaches have experienced disadvantages since techniques relying upon fixed parameters often lead to less-than-optimum predictions or estimations, which in turn reduces the accuracy and/or reliability of the tire load predictions.

As a result, there is a need in the art for a system and method that accurately and reliably estimates tire load.

SUMMARY OF THE INVENTION

According to an aspect of an exemplary embodiment of the invention, a tire load estimation system is provided. The system includes at least one tire that supports a vehicle, in which the at least one tire includes a pair of sidewalls extending to a circumferential tread. A sensor is mounted to the at least one tire. A footprint is formed by the tread and includes a centerline with a footprint centerline length. The footprint centerline length is measured by the sensor. A tire load estimator, the tire load estimator receives a precalibrated sensitivity, the footprint centerline length during straight-line driving conditions, a reference footprint value, and a reference load value as inputs. The tire load estimator determines an estimation of tire load and outputs the estimation to at least one of a vehicle control system and a vehicle electronic control unit.

According to another aspect of an exemplary embodiment of the invention, a method for estimating the load of a tire is provided. The method includes mounting a sensor to at least one tire that supports a vehicle. The at least one tire includes a pair of sidewalls extending to a circumferential tread, and the tread forms a footprint. A centerline length of the footprint is measured with the sensor. A tire load estimator is provided, and a precalibrated sensitivity, the footprint centerline length during straight-line driving conditions, and a reference footprint value are determined. A reference load value is obtained. A tire load is estimated with the tire load estimator based on the precalibrated sensitivity, the footprint centerline length during straight-line driving conditions, the reference footprint value and the reference load value. The estimated tire load is output to at least one of a vehicle control system and a vehicle electronic control unit.

BRIEF DESCRIPTION OF THE DRAWINGS

The invention will be described by way of example and with reference to the accompanying drawings, in which:

FIG. 4b is a graphical representation of determinations of the sensitivity ratio shown in FIG. 4a;

Similar numerals refer to similar parts throughout the drawings.

Definitions

"Axial" and "axially" means lines or directions that are parallel to the axis of rotation of the tire.

"CAN bus" is an abbreviation for controller area network.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface, such as the ground, as the tire rotates or rolls.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Tread element" or "traction element" means a rib or a block element defined by a shape having adjacent grooves.

"Tread Arc Width" means the arc length of the tread as measured between the lateral edges of the tread.

DETAILED DESCRIPTION OF THE INVENTION

Figure 1:
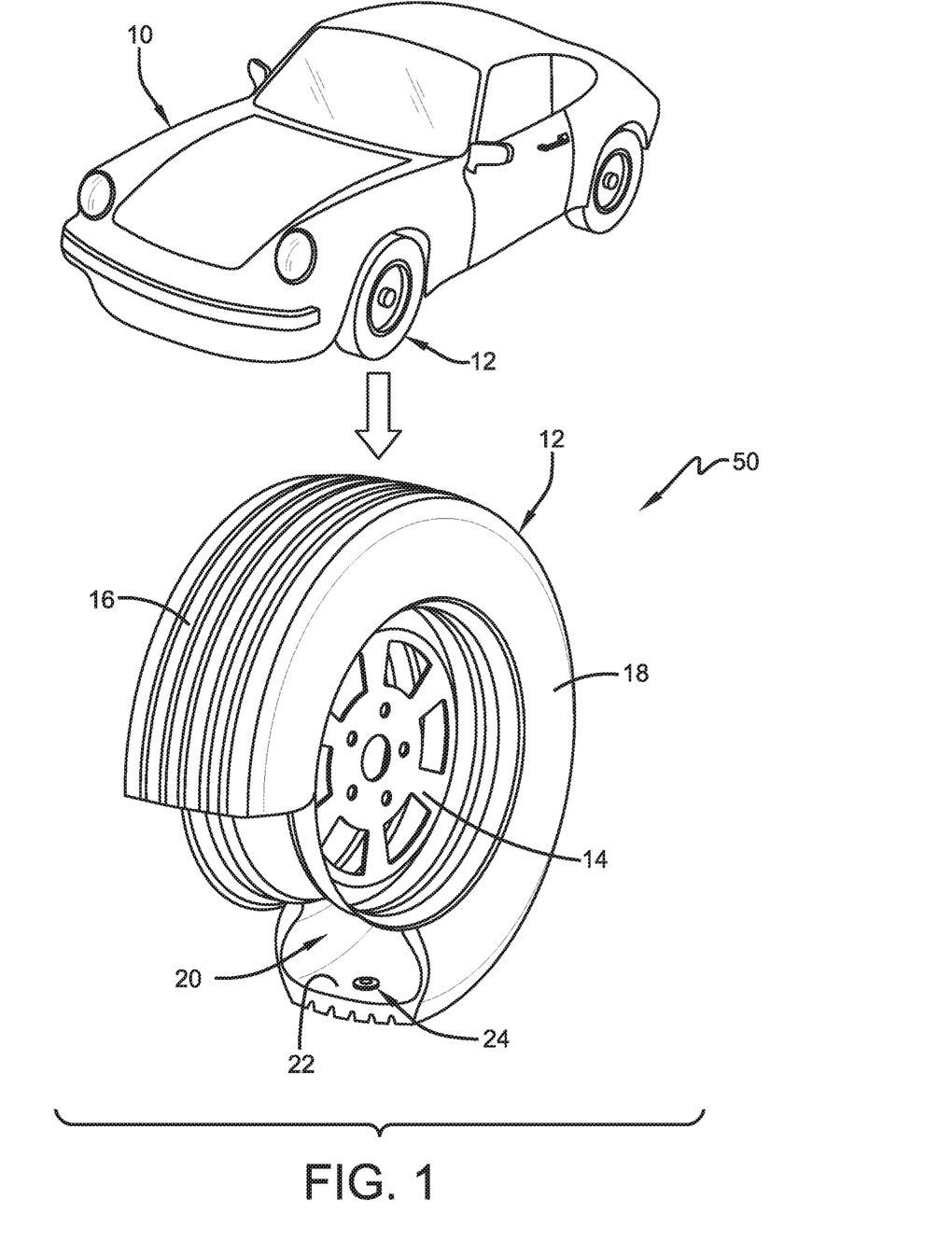
FIG. 1 is a perspective view of a vehicle and sensor-equipped tire employing the tire load estimation system and method of the present invention.

A first exemplary embodiment of the tire load estimation system of the present invention is indicated at 50 in FIGS. 1 through 13. With particular reference to FIG. 1, the system 50 estimates the load on each tire 12 supporting a vehicle 10. While the vehicle 10 is depicted as a passenger car, the invention is not to be so restricted. The principles of the invention find application in other vehicle categories such as commercial trucks in which vehicles may be supported by more or fewer tires than shown in FIG. 1.

The tires 12 are of conventional construction and are mounted on a wheel 14. Each tire 12 includes a pair of sidewalls 18 that extend to a circumferential tread 16, which engages the ground during vehicle operation. Each tire 12 preferably is equipped with a sensor 24 that is mounted to the tire for the purpose of detecting certain real-time tire parameters, such as tire pressure and temperature. For example, the sensor 24 may be a commercially-available tire pressure monitoring system (TPMS) module or sensor, which may be affixed to an inner liner 22 of the tire 12 by suitable means such as adhesive. The sensor 24 preferably includes a pressure sensor to sense the inflation pressure within a cavity 20 of the tire 12, and a temperature sensor to sense the temperature of the tire 12 and/or the temperature in the cavity.

The sensor 24 preferably also includes a processor and memory to store tire identification (tire ID) information for each specific tire 12. For example, the tire ID may include manufacturing information for the tire 12, including: the tire model; size information, such as rim size, width, and outer diameter; manufacturing location; manufacturing date; a treadcap code that includes or correlates to a compound identification; and a mold code that includes or correlates to a tread structure identification. The tire ID may also include a service history or other information to identify specific features and parameters of each tire 12. The sensor 24 preferably further includes an antenna for transmitting measured parameters and tire ID data to a remote processor, such as a processor integrated into the vehicle CAN bus, for analysis.

The tire load estimation system 50 and accompanying method attempts to overcome the above-described challenges posed by prior art systems and methods that seek to measure the tire load through direct sensor measurements. As such, the subject system and method is referred herein as an "indirect" load estimation system and method. In addition, the tire load estimation system 50 and accompanying method attempts to overcome the above-described challenges posed by prior art systems and methods that that involve estimation of tire load using fixed parameters. The tire load estimation system 50 and accompanying method thus utilize an indirect approach to avoid the disadvantages of direct-measurement techniques, and rather than relying on fixed parameters, incorporate multiple tire and vehicle parameters in monitoring a change in the tire footprint length to provide an accurate and reliable estimation of tire load.

Aspects of the tire load estimation system 50 preferably are executed on a processor that is accessible through the vehicle CAN bus. Use of such a processor, and accompanying memory, enables input of data from the tire-based sensor 24, data from certain vehicle-based sensors to be described below, and data from a lookup table or a database that is stored in a suitable storage medium and is in electronic communication with the processor.

Figure 2:
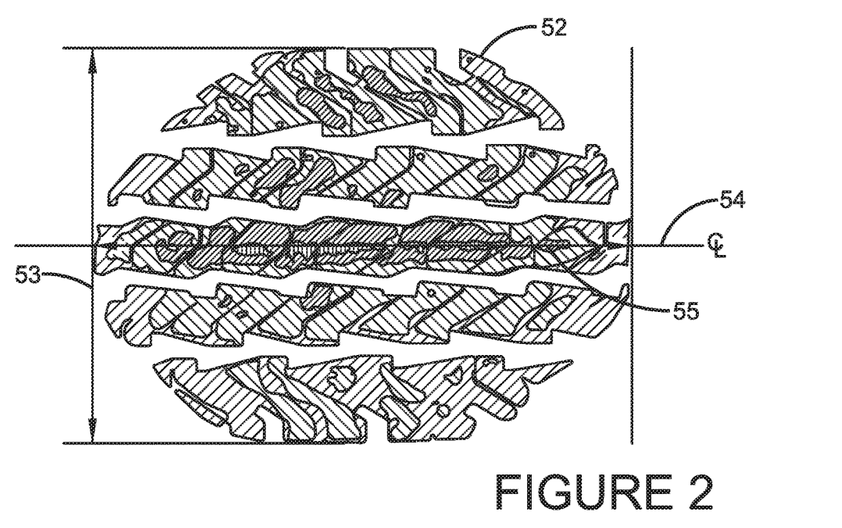
FIG. 2 is a plan view of the footprint of the tire shown in FIG. 1.

Turning now to FIG. 2, a footprint 52 of the tread 16 of the tire 12 (FIG. 1) is shown. The footprint 52 is the area that is created or formed as the tread 16 contacts the ground as the tire 12 rotates. The footprint 52 includes a width 53 that extends in a lateral direction across the tread 16. The footprint 52 also includes a centerline 54 that extends in a circumferential direction, that is, perpendicular to an axial or lateral direction. The centerline 54 is disposed at the middle of the width 53 of the footprint 54, and includes a length 55 that is referred to as the footprint centerline length.

The footprint centerline length 55 may be sensed by the sensor unit 24 (FIG. 1) or by another suitable sensor. For example, the sensor 24 may include a strain sensor or piezoelectric sensor that measures deformation of the tread 16 and thus indicates the footprint centerline length 55. As will be described in greater detail below, the length of the tire footprint 52, and particularly the footprint centerline length 55, exhibits a nearly linear correlation with tire load.

Figure 3:
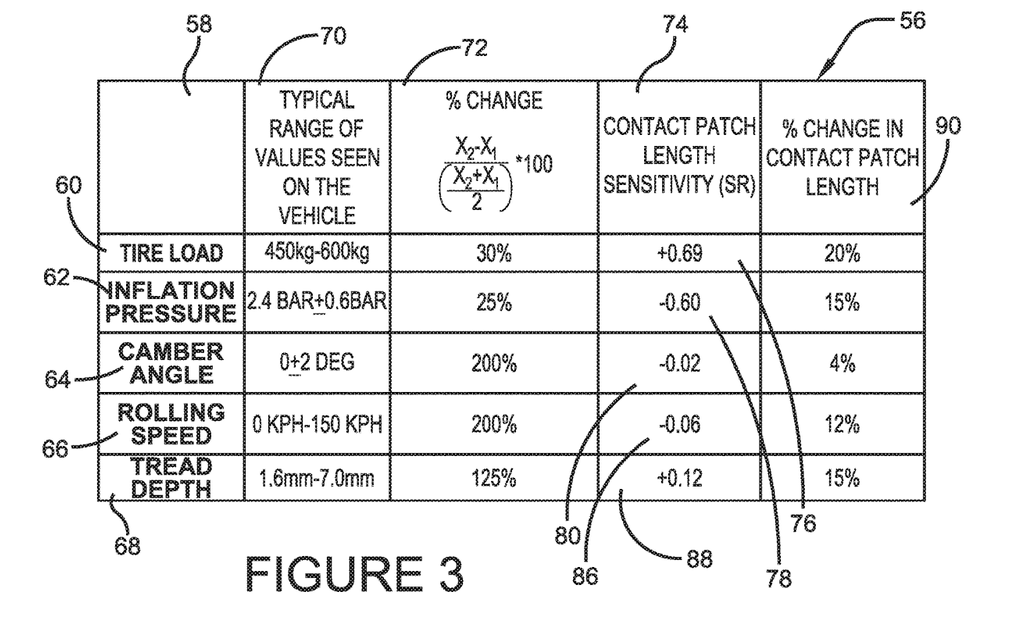
FIG. 3 is a chart showing sensitivity analysis information in accordance with the tire load estimation system and method of the present invention.

With reference to FIG. 3, testing was conducted to determine variables that affect the footprint centerline length 55. The results of the testing are shown in the table indicated at 56. Column 1, indicated at 58, lists tire operating conditions that were found to affect the footprint centerline length 55, including: the load on the tire 12, which is referred to as tire load 60; the pressure level to which the tire cavity 20 is filled with air, which is referred to as inflation pressure 62; the angle between the equatorial centerplane of the tire and a vertical axis, which is referred to as camber angle 64; and the rotational velocity of the tire as it rolls, which is referred to as rolling speed 66. It was also found that the tire footprint 52 and the footprint centerline length 55 evolve as the tire 12 wears, which is indicated by the depth of the tread 16 and referred to as tread depth 68. By way of background, a higher tread depth 68 generally corresponds to a newer and/or less worn tire 12, while a lower tread depth generally corresponds to an older and/or more worn tire.

Column 2, indicated at 70, shows the range of values for each respective variable, while Column 3, indicated at 72, shows the percentage change of each respective variable during testing. Column 4, indicated at 74, shows a value referred to as a sensitivity ratio SR for each respective variable. The sensitivity ratio SR has been found to be an indication of the magnitude of the effect of each variable on the footprint centerline length 55.

Figure 4A:
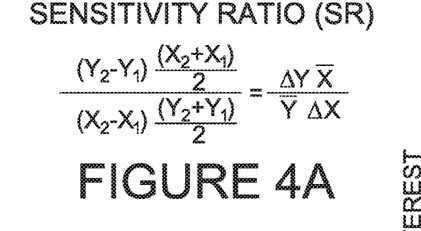
FIG. 4a is a representation of a sensitivity ratio determination in accordance with the tire load estimation system and method of the present invention.
Figure 4B:
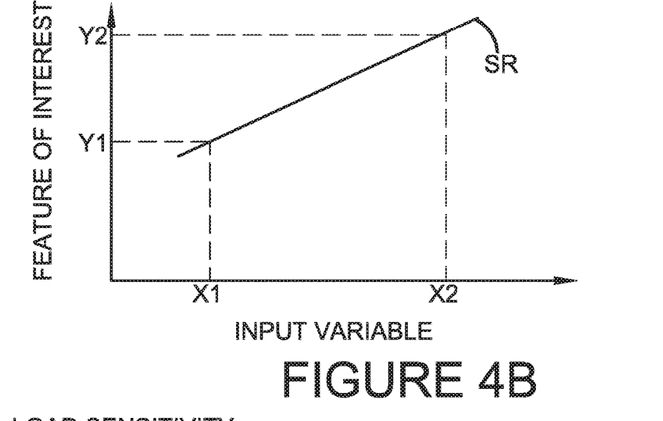

With additional reference to FIG. 4a, the calculation of the sensitivity ratio SR is shown, and may be indicated as: percentage change of the footprint centerline length 55 divided by the percentage change in the respective variable. The linear relationship of the sensitivity ratio SR is shown in FIG. 4b.

Figure 5:
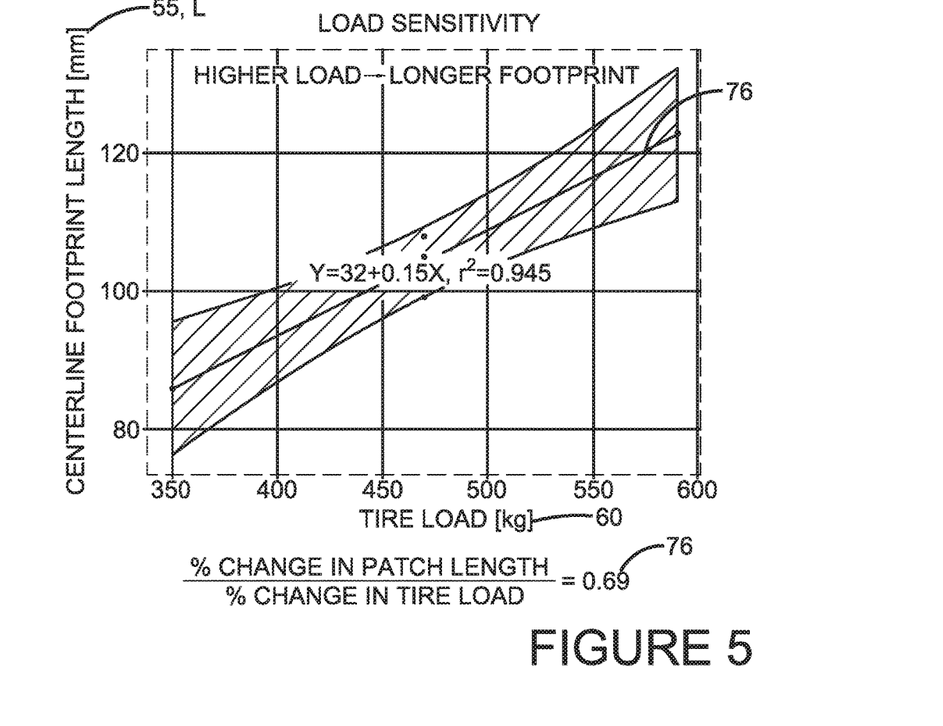
FIG. 5 is a graphical representation of tire load sensitivity in accordance with the tire load estimation system and method of the present invention.
Figures 6, 7A:
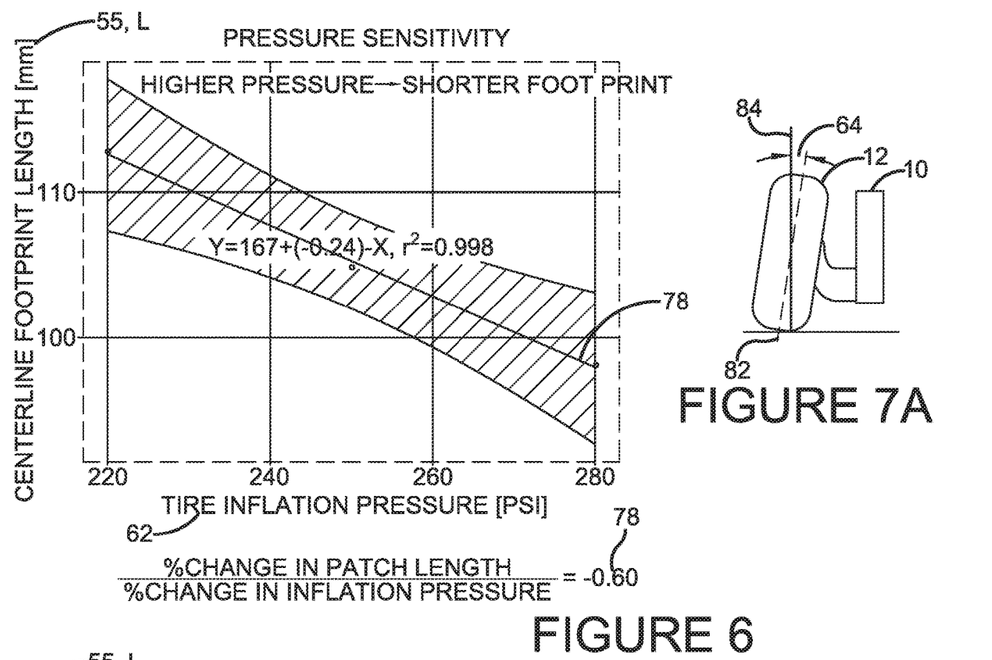
FIG. 6 is a graphical representation of inflation pressure sensitivity in accordance with the tire load estimation system and method of the present invention.
FIG. 7a is a schematic representation of camber angle of the tire shown in FIG. 1.
Figure 7B:
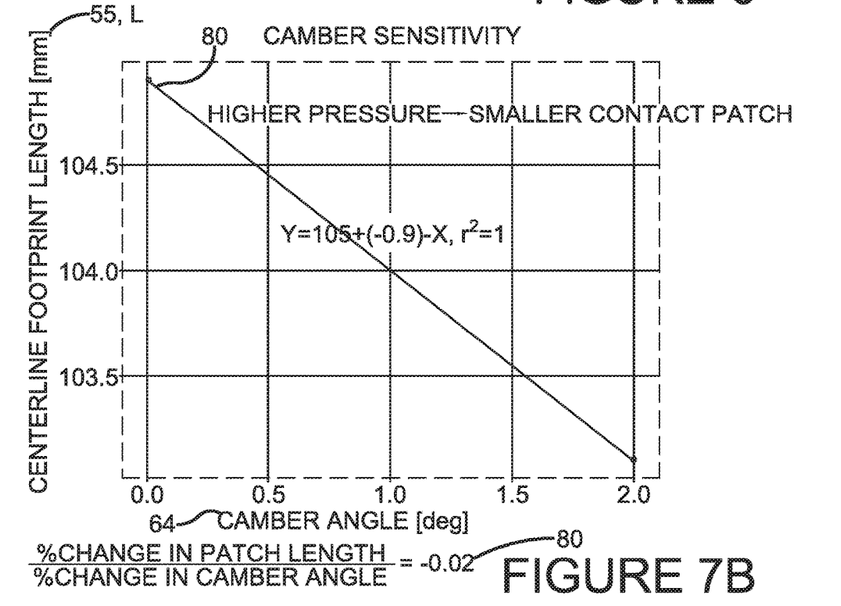
FIG. 7b is a graphical representation of camber angle sensitivity in accordance with the tire load estimation system and method of the present invention.
Figure 8:
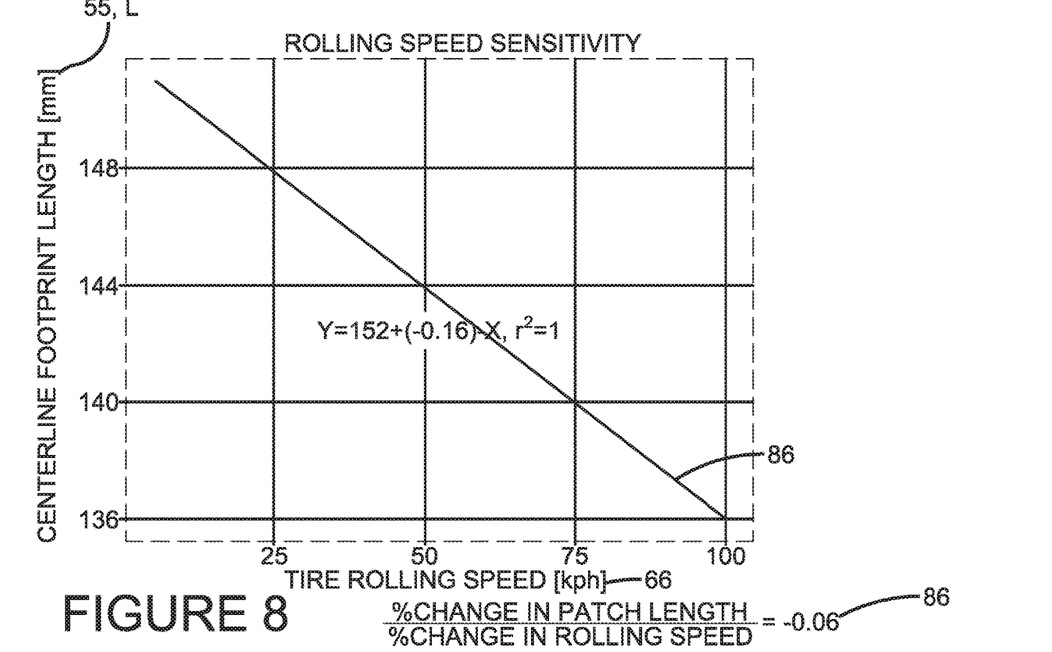
FIG. 8 is a graphical representation of rolling speed sensitivity in accordance with the tire load estimation system and method of the present invention.
Figure 9:
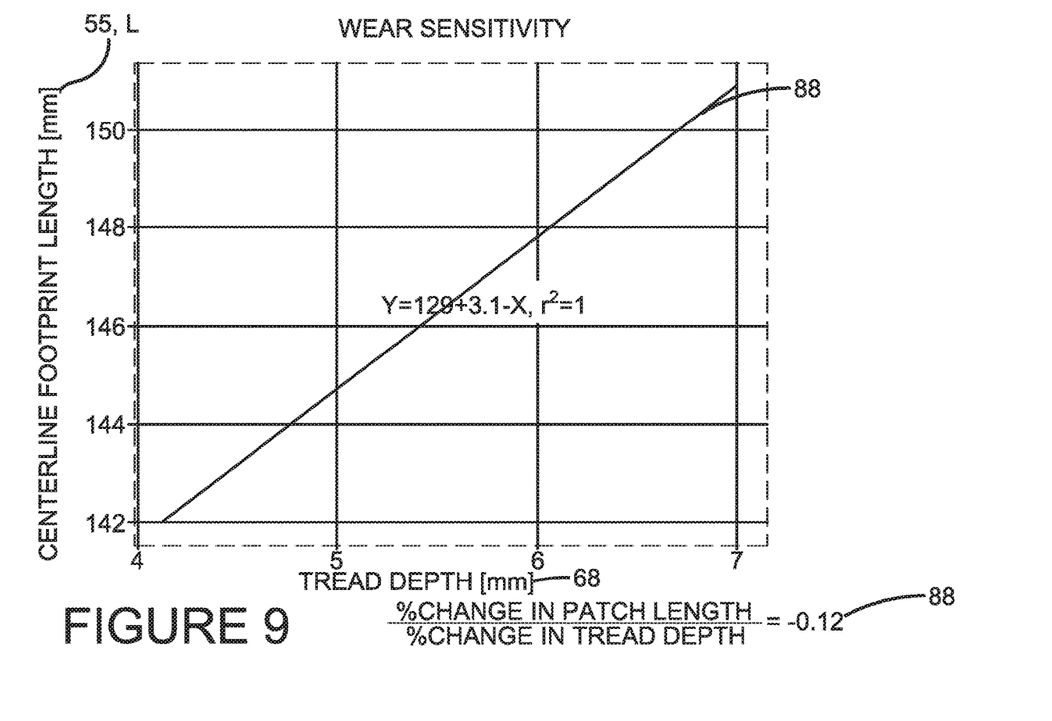
FIG. 9 is a graphical representation of wear or tread depth sensitivity in accordance with the tire load estimation system and method of the present invention.

Graphical representations of the sensitivity ratio SR for each respective variable are shown in FIGS. 5 through 9. More particularly, FIG. 5 shows a sensitivity ratio SR, indicated at 76, based on the variable of tire load 60. FIG. 6 shows a sensitivity ratio SR, indicated at 78, based on the variable of inflation pressure 62. FIG. 7a illustrates the camber angle 64, which is the angle between the equatorial centerplane 82 of the tire 12 and a vertical axis 84, and FIG. 7b shows a sensitivity ratio SR, indicated at 80, based on the variable of camber angle. FIG. 8 shows a sensitivity ratio SR, indicated at 86, based on the variable of rolling speed 66. FIG. 9 shows a sensitivity ratio SR, indicated at 88, based on the variable of wear or tread depth 68. Returning to FIG. 5, Column 5, indicated at 90, indicates the measured percentage change in the footprint centerline length 55 for each respective variable.

As shown in FIG. 5, the sensitivity ratio SR thus has been found to be an indication of the magnitude of the effect of tire load 60, inflation pressure 62, camber angle 64, rolling speed 66 and tread depth 68 on the footprint centerline length 55. The advantage of the sensitivity ratio SR is that it is dimensionless and thus may be based on magnitude alone. By determining that tire load 60, inflation pressure 62, camber angle 64, rolling speed 66 and tread depth 68, which vary during vehicle operation, affect the footprint centerline length 55, it has been found that it is not practical to employ an estimation or prediction model with parameters that are fixed.

Figure 10:
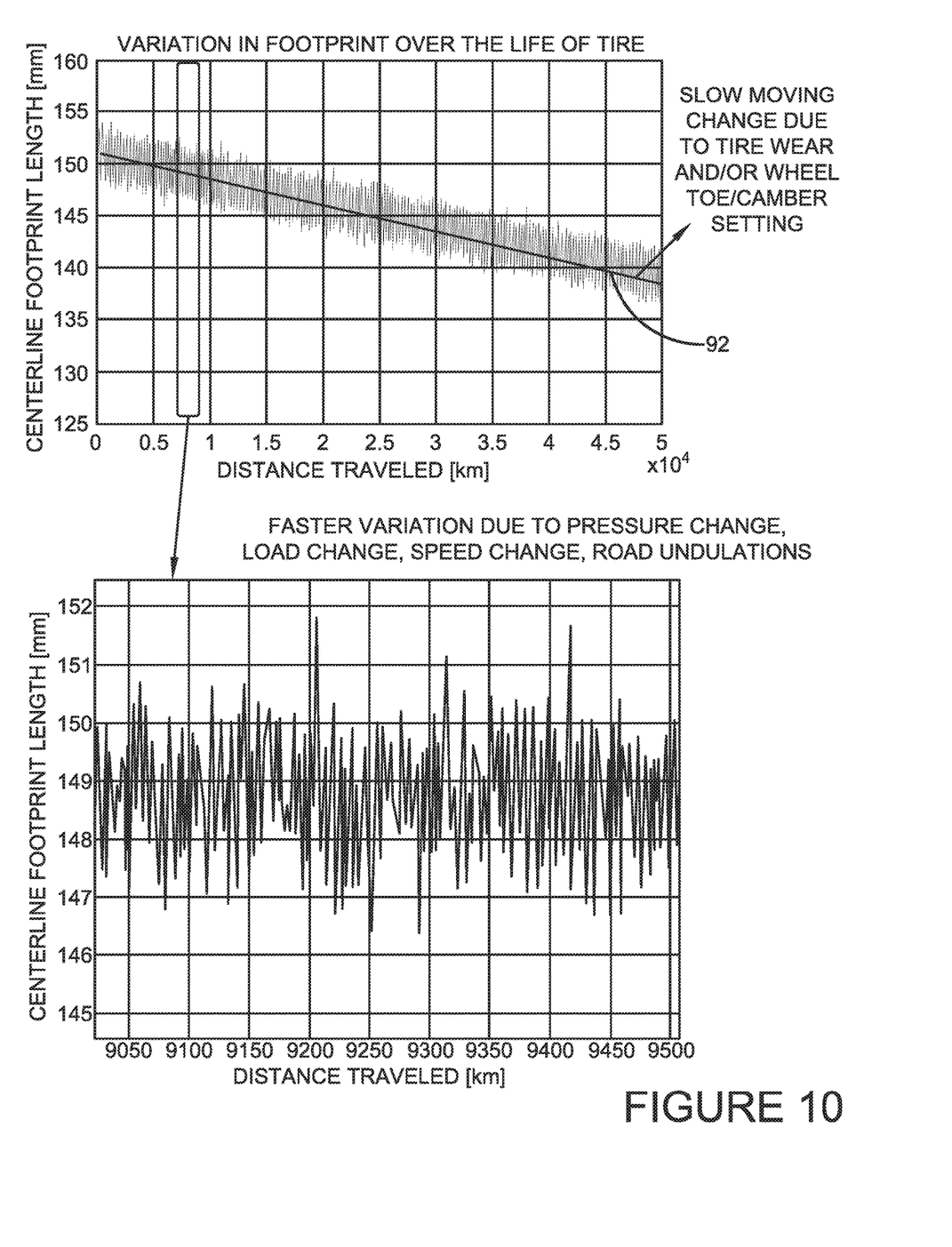
FIG. 10 is a graphical representation of variation in the tire footprint over the life of the tire shown in FIG. 1.

In addition, as shown in FIG. 10, there is variation, indicated at 92, in the tire footprint 52 over the life of the tire 12. Because of this, it has been found that an estimation technique should account or compensate for a slow-moving change in the footprint centerline length 55 happening over a relatively long time span.

Figure 11:
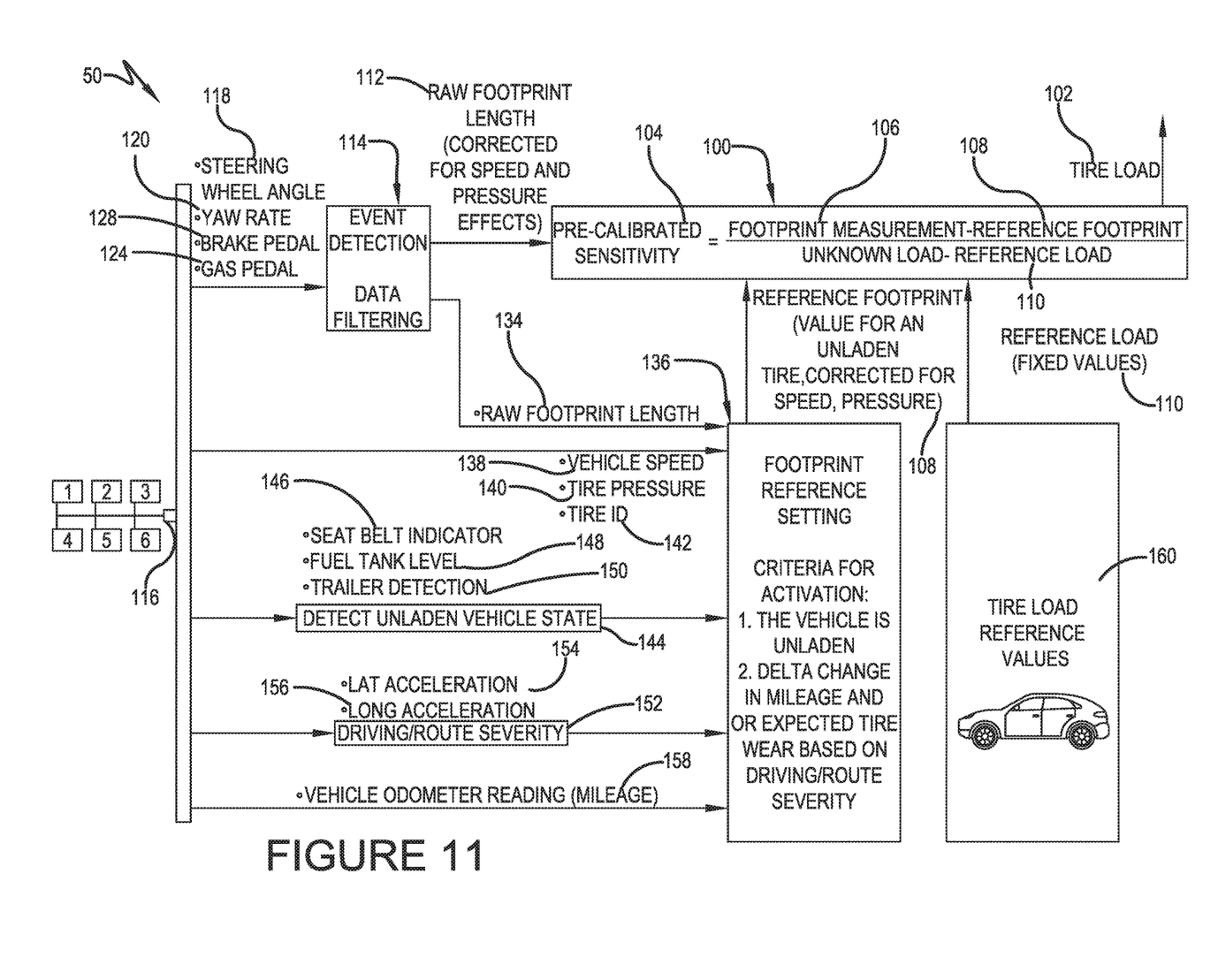
FIG. 11 is a flow diagram showing aspects of the tire load estimation system and method of the present invention.

Turning now to FIG. 11, aspects of the tire load estimation system 50 of the present invention are shown. The system 50 includes a tire load estimator 100, which outputs an estimation of tire load 102. The estimator 100 takes into account a predetermined or precalibrated sensitivity 104, a footprint measurement 106, a reference footprint 108 and a reference load 110. By using the following equation, the tire load 102, which is indicated as "unknown load", may be determined by the tire load estimator 100:

$$\text{Precalibrated sensitivity } 104 = \frac{(\text{footprint measurement } 106 - \text{reference footprint } 108)}{(\text{unknown load} - \text{reference load } 110)}.$$

The pre-calibrated sensitivity 104 is determined in advance according to the behavior of a specific tire 12 based on inflation pressure 62, camber angle 64, rolling speed 66, tread depth 68, ageing, construction and/or material properties as described above. Other inputs into the estimator 100 include the footprint measurement 106, the reference footprint 108 and the reference load 110, as will be described below.

The input of footprint measurement 106 includes a raw footprint length 112, which is the footprint centerline length 55 (FIG. 2) as measured by the sensor unit 24 (FIG. 1) and corrected for vehicle speed and inflation pressure. The correction for vehicle speed and inflation pressure includes inputting a measured vehicle speed as indicated by a vehicle speedometer or other vehicle velocity indicator, inputting a measured tire pressure as indicated by the sensor 24, and adjusting the measured footprint centerline length 55 to account for any inaccuracies in the measurement value due to vehicle speed and/or improper inflation pressure. Because the footprint centerline length 55 is only reliable during straight-line driving conditions, an event detection module 114 is employed to select measurements of the footprint centerline only during such conditions.

Figure 12:
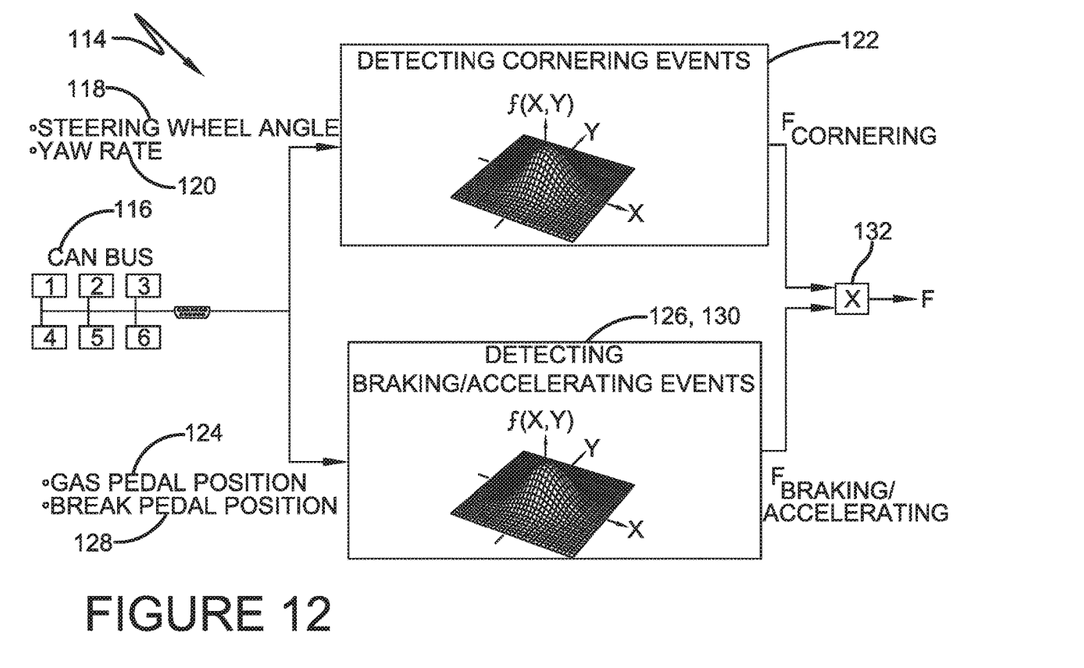
FIG. 12 is a flow diagram showing details of event detection from FIG. 11.

With additional reference to FIG. 12, the event detection module 114 receives inputs from vehicle-based sensors through the vehicle CAN bus 116. More particularly, the CAN bus 116 provides data on the angle of the vehicle steering wheel, indicated at 118, and data on the vehicle yaw rate, indicated at 120. When the steering wheel angle 118 exceeds a predetermined threshold, it is likely that the vehicle 10 is executing a cornering event 122. Likewise, when the vehicle yaw rate 120 exceeds a predetermined threshold, it is likely that the vehicle 10 is executing a cornering event 122. The CAN bus 116 also provides data on the position of the vehicle gas pedal, indicated at 124, and data on the position of the vehicle brake pedal, indicated at 126. When the gas pedal position 124 exceeds a predetermined threshold, it is likely that the vehicle 10 is executing an acceleration event. When the brake pedal position 126 exceeds a predetermined threshold, it is likely that the vehicle 10 is executing a braking event.

When the steering wheel angle 118, yaw rate 120, gas pedal position 124 and/or brake pedal position 128 exceed the respective thresholds, a filtering module 132 analyzes the data signals to determine if a cornering event 122, acceleration event 126 and/or braking event 130 is taking place. If so, the filtering module 132 filters out measurements of the footprint centerline length 55 during the cornering event 122, acceleration event 126 and/or braking event 130. While any known selection technique may be employed in the filtering module 132, a heuristic computation using bivariate gaussian functions is preferred, as bivariate gaussian functions enable the filtering module to be less sensitive to measurement noise as compared to techniques employing "fixed" thresholds.

In this manner, the raw footprint length 112, which is the footprint centerline length 55 measured by the sensor unit 24 during straight-line driving conditions, as corrected for vehicle speed and inflation pressure, is selected for the footprint measurement 106 input into the tire load estimator 100.

To determine the input of the reference footprint 108 for the tire load estimator 100, a raw footprint length 134 as measured by the sensor unit 24 and selected by the event detection module 114 for straight-line driving conditions is input into a reference footprint generator 136. The reference footprint generator 136 determines the footprint centerline length 55 for an unladen tire 12, as corrected for vehicle speed and inflation pressure, which is then provided as the reference footprint value 108, as will be described below.

With continuing reference to FIG. 11, to determine the reference footprint value 108 based on real-time parameters, multiple inputs are provided to the reference footprint generator 136. As mentioned above, one parameter that is input is the raw footprint length 134. Other input parameters for the reference footprint generator 136 include the measured vehicle speed 138 as indicated by a vehicle speedometer or other vehicle velocity indicator, the measured tire pressure 140 as indicated by the sensor 24, and tire ID data 142 provided by the sensor as described above.

Another input parameter for the reference footprint generator 136 is an unladen state identifier 144. More particularly, because the reference footprint value 108 is based upon an unladen tire 12, it is desirable for the raw footprint length 134 to be provided only when it is determined that the vehicle 10 is unladen. The unladen state identifier 144 receives inputs from vehicle-based sensors through the vehicle CAN bus 116.

More particularly, the CAN bus 116 provides data on the engagement of seat belts 146, car seat occupancy sensor, the level of fluid in the fuel tank 148 and/or whether a trailer is being hauled 150. The seat belt indicator 146 and/or the car seat occupancy sensor indicates when occupants are in the vehicle 10 during vehicle operation. Since the unit weight of vehicle fuel is known, the fuel tank level 148 may be used to calculate the weight of fuel and offset a known mass of the vehicle. For a vehicle 10 that may transport a trailer, the trailer indicator 150 indicates when a trailer is connected. These inputs are received in the unladen state identifier 144, which employs any known selection technique to determine if the vehicle is unladen. For example, a heuristic-based model may be employed in the identifier 144.

Another input parameter for the reference footprint generator 136 includes a driving/route severity estimator 152. The driving/route severity estimator 152 receives inputs from vehicle-based sensors through the vehicle CAN bus 116. More particularly, the CAN bus 116 provides data on the vehicle lateral acceleration 154 and the vehicle longitudinal acceleration 156 to enable the driving/route severity estimator 152 to determine whether a change in tire wear is expected due to driving and/or route severity. One other input for the reference footprint generator 136 is the vehicle mileage 158 from a vehicle odometer or other mileage sensor.

The reference footprint generator 136 thus receives the above-described inputs and proceeds as follows. The determination of the unladen state identifier 144 is input to ensure that the vehicle 10 is unladen. If the vehicle 10 is unladen, the vehicle mileage input 158 is used to determine if there has been a change in vehicle mileage, and the driving/route severity estimator input 152 is used to determine a change in expected tire wear based on driving and/or route severity. Either factor of vehicle mileage 158 and driving/route severity 152 indicates an expected change in tire wear and thus the footprint centerline length 55. As a result, when the vehicle is unladen and at least one of the vehicle mileage 158 and driving/route severity 152 change conditions is met, the raw footprint length input 134 is corrected for vehicle speed 138 and inflation pressure 140 by the reference footprint generator 136. The reference footprint 108 thus is determined and input from the reference footprint generator 136 into the tire load estimator 100.

To determine the input of the reference load value 110 for the tire load estimator 100, reference values are stored in a lookup table 160 that is in an electronically accessible memory. An appropriate load value 110 is selected from the lookup table 160 and input into the tire load estimator 100.

In this manner, the values of sensitivity 104, footprint measurement 106, reference footprint 108 and reference load 110 are determined, and are input into the tire load estimator 100. The estimator then employs the above-described calculation to output the estimation of tire load 102. The tire load estimation 102 is electronically communicated through the vehicle CAN bus 116 to a vehicle electronic control unit and/or a vehicle control system, such as the braking system and/or the suspension system, to increase the performance of such systems.

Figure 13:
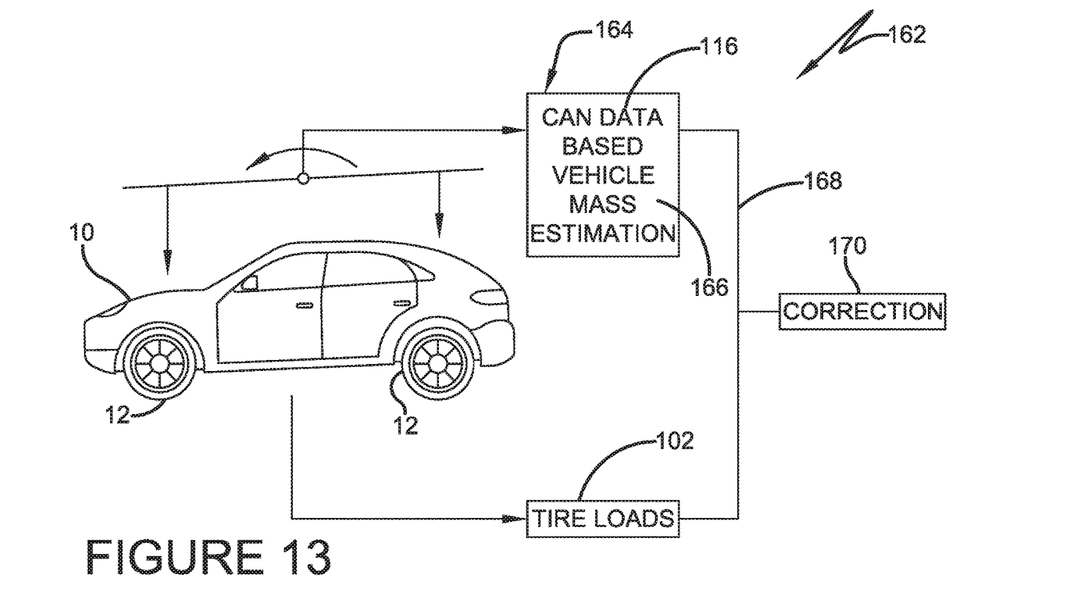
FIG. 13 is a flow diagram showing an optional mass estimation aspect of the tire load estimation system and method of the present invention.

Turning to FIG. 13, as an optional feature, the tire load estimation system 50 may include a vehicle mass estimator 162. The mass estimator 162 includes a model-based observer 164 that receives data through the CAN bus system 116 to indirectly estimate a mass 166 of the vehicle 10. The mass estimator 162 employs a feedback loop 168 using the estimated vehicle mass 166 and the tire load 102 from the estimator 100 (FIG. 11) to determine a correction 170 to the tire load 102. Use of the vehicle mass estimator 162 may thus improve the accuracy of the tire load estimation system 50.

In this manner, the tire load estimation system 50 of the present invention accurately and reliably estimates tire load. The tire load estimation system 50 is based upon input from multiple sensors and includes a sensitivity analysis of the tire 12 to arrive at a tire sensitivity 104, a footprint centerline length 106 as adjusted for event detection, a reference footprint setting 108 which incorporates multiple tire and vehicle parameters, and a reference load 110.

Rather than being based on fixed parameters, the tire load estimation system 50 monitors a change in the tire footprint 52. The reference footprint value 106 for the tire load estimation system 50 is updated when the vehicle 10 is unladen and the system detects a large enough change in vehicle mileage 158 and/or change in expected tire wear based on driving/route severity 152. The tire load estimation system 50 thus uses a short time scale localized reference value of footprint centerline length 55 to detect a load change. As such, the tire load estimation system 50 is immune to noise coming from tire wear and manufacturing variation, such as changes in the vehicle toe/camber settings and variation in tire footprints from one tire to another.

The present invention also includes a method for estimating the load of a tire 12. The method includes steps in accordance with the description that is presented above and shown in FIGS. 1 through 13.

It is to be understood that the structure and method of the above-described tire load estimation system may be altered or rearranged, or components or steps known to those skilled in the art omitted or added, without affecting the overall concept or operation of the invention.

The invention has been described with reference to preferred embodiments. Potential modifications and alterations will occur to others upon a reading and understanding of this description. It is to be understood that all such modifications and alterations are included in the scope of the invention as set forth in the appended claims, or the equivalents thereof.

What is claimed is:

1. A tire load estimation system comprising:
   at least one tire supporting a vehicle, the at least one tire including a pair of sidewalls extending to a circumferential tread;
   a sensor mounted to the at least one tire;
   a footprint formed by the tread, the footprint including a centerline with a footprint centerline length, wherein the footprint centerline length is measured by the sensor;

an event detection module to select measurements of the footprint centerline length during straight-line driving conditions, the event detection module receiving as an input at least one of a steering wheel angle, a yaw rate, a gas pedal position and a brake pedal position;

a filtering module analyzing the event detection module input to determine if at least one of a cornering event, an acceleration event and a braking event is taking place, whereby when at least one of a cornering event, an acceleration event and a braking event is taking place, the filtering module excludes selection of measurements of the length of the footprint centerline; and a tire load estimator, the tire load estimator receiving as inputs:
  a pre-calibrated sensitivity;
  the footprint centerline length during straight-line driving conditions from the event detection module;
  a reference footprint value; and
  a reference load value, wherein the tire load estimator determines an estimation of tire load and outputs the estimation to at least one of a vehicle control system and a vehicle electronic control unit.

2. The tire load estimation system of claim 1, wherein the filtering module employs a heuristic computation using bivariate gaussian functions.

3. The tire load estimation system of claim 1, wherein the footprint centerline length as measured by the sensor is corrected for a measured vehicle speed and a measured inflation pressure.

4. The tire load estimation system of claim 1, wherein the reference load value for the tire load estimator includes a reference values from a lookup table.

5. The tire load estimation system of claim 1, further comprising a vehicle mass estimator including a model-based observer to indirectly estimate a mass of the vehicle and determine a correction to the estimation of tire load.

6. The tire load estimation system of claim 1, wherein the precalibrated sensitivity is determined with a sensitivity analysis, the sensitivity analysis including the determination of a sensitivity ratio for at least one variable that affects the footprint centerline length.

7. The tire load estimation system of claim 6, wherein the sensitivity ratio is a percentage change of the footprint centerline length divided by the percentage change in the at least one variable.

8. The tire load estimation system of claim 6, wherein the at least one variable includes at least one of inflation pressure, camber angle, rolling speed and tread depth.

9. A tire load estimation system comprising:
  at least one tire supporting a vehicle, the at least one tire including a pair of sidewalls extending to a circumferential tread;
  a sensor mounted to the at least one tire;
  a footprint formed by the tread, the footprint including a centerline with a footprint centerline length, wherein the footprint centerline length is measured by the sensor;
  a tire load estimator, the tire load estimator receiving as inputs:
    a pre-calibrated sensitivity;
    the footprint centerline length during straight-line driving conditions;
    a reference footprint value; and
    a reference load value;
  a reference footprint generator to determine the reference footprint value for input into the tire load estimator, the reference footprint generator including:
    an unladen state identifier to determine if the vehicle is unladen; and
    at least one of a vehicle mileage input and a driving/route severity estimator input to determine an expected change in tire wear, whereby the reference footprint generator determines the reference footprint value when the vehicle is unladen and there is an expected change in tire wear; and
  wherein the tire load estimator determines an estimation of tire load and outputs the estimation to at least one of a vehicle control system and a vehicle electronic control unit.

10. The tire load estimation system of claim 9, wherein the reference footprint value determined by the reference footprint generator includes the measured footprint centerline length during straight-line driving conditions as corrected for a measured vehicle speed and a measured inflation pressure.

11. The tire load estimation system of claim 9, wherein the unladen state identifier receives as an input at least one of an engagement of seat belts, a level of fluid in a fuel tank and whether a trailer is being hauled.

12. The tire load estimation system of claim 9, wherein the driving/route severity estimator includes at least one of a vehicle lateral acceleration and a vehicle longitudinal acceleration.

13. A method for estimating the load of a tire, the method comprising the steps of:
  mounting a sensor to at least one tire supporting a vehicle, wherein the at least one tire includes a pair of sidewalls extending to a circumferential tread, and the tread forms a footprint;
  measuring with the sensor a centerline length of the footprint;
  providing a tire load estimator;
  determining a pre-calibrated sensitivity;
  determining the footprint centerline length during straight-line driving conditions, wherein determining the footprint centerline length during straight-line driving conditions includes:
    selecting measurements of the footprint centerline length during straight-line driving conditions with an event detection module;
    inputting at least one of a steering wheel angle, a yaw rate, a gas pedal position and a brake pedal position into the event detection module;
    analyzing the event detection module input with a filtering module to determine if at least one of a cornering event, an acceleration event and a braking event is taking place; and
    excluding selection of measurements of the length of the footprint centerline with the filtering module when at least one of a cornering event, an acceleration event and a braking event is taking place;
  determining a reference footprint value;
  obtaining a reference load value;
  estimating a tire load with the tire load estimator based on the precalibrated sensitivity, the footprint centerline length during straight-line driving conditions, the reference footprint value and the reference load value; and
  outputting the estimated tire load to at least one of a vehicle control system and a vehicle electronic control unit.

14. The method for estimating the load of a tire claim 13, wherein the step of determining the footprint centerline length during straight-line driving conditions includes correcting the footprint centerline length as measured by the sensor for a measured vehicle speed and a measured inflation pressure.

15. The method for estimating the load of a tire claim 13, wherein the step of determining a precalibrated sensitivity includes determining the precalibrated sensitivity with a sensitivity analysis, the sensitivity analysis including the determination of a sensitivity ratio for at least one variable that affects the footprint centerline length, and the at least one variable includes at least one of inflation pressure, camber angle, rolling speed and tread depth.

16. A method for estimating the load of a tire, the method comprising the steps of:
   mounting a sensor to at least one tire supporting a vehicle, wherein the at least one tire includes a pair of sidewalls extending to a circumferential tread, and the tread forms a footprint;
   measuring with the sensor a centerline length of the footprint;
   providing a tire load estimator;
   determining a pre-calibrated sensitivity;
   determining the footprint centerline length during straight-line driving conditions;
   determining a reference footprint value, wherein determining a reference footprint value includes determining the reference footprint value with a reference footprint generator, the reference footprint generator including:
      an unladen state identifier to determine if the vehicle is unladen, the unladen state identifier receiving as an input at least one of an engagement of seat belts, a level of fluid in a fuel tank and whether a trailer is being hauled; and
      at least one of a vehicle mileage input and a driving/route severity estimator input to determine an expected change in tire wear, the driving/route severity estimator input including at least one of a vehicle lateral acceleration and a vehicle longitudinal acceleration, whereby the reference footprint generator determines the reference footprint value when the vehicle is unladen and there is an expected change in tire wear;
   obtaining a reference load value;
   estimating a tire load with the tire load estimator based on the precalibrated sensitivity, the footprint centerline length during straight-line driving conditions, the reference footprint value and the reference load value; and
   outputting the estimated tire load to at least one of a vehicle control system and a vehicle electronic control unit.

17. The method for estimating the load of a tire claim 16, wherein the step of determining the reference footprint value with the reference footprint generator includes correcting the footprint centerline length as measured by the sensor for a measured vehicle speed and a measured inflation pressure.

* * * * *